US007545063B2

(12) United States Patent
Yoshida et al.

(10) Patent No.: US 7,545,063 B2
(45) Date of Patent: Jun. 9, 2009

(54) WIRE-CONNECTION STRUCTURE OF MOTOR

(75) Inventors: Hideyuki Yoshida, Wako (JP); Akihiro Watanabe, Wako (JP); Kenji Fukuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 483 days.

(21) Appl. No.: 11/468,093

(22) Filed: Aug. 29, 2006

(65) Prior Publication Data

US 2007/0052307 A1    Mar. 8, 2007

(30) Foreign Application Priority Data

Sep. 2, 2005    (JP)    ............... 2005-254569

(51) Int. Cl.
  *H02K 11/00*    (2006.01)
(52) U.S. Cl. .......................... 310/71; 310/179
(58) Field of Classification Search .............. 310/71, 310/179–184, 208, 201, 216
  See application file for complete search history.

(56) References Cited

U.S. PATENT DOCUMENTS

| | | | |
|---|---|---|---|
| 6,271,608 B1 * | 8/2001 | Haydock et al. ............... 310/71 |
| 6,600,244 B2 * | 7/2003 | Okazaki et al. ............... 310/71 |
| 6,856,057 B2 * | 2/2005 | Kobayashi et al. ............ 310/71 |
| 6,894,410 B2 * | 5/2005 | Kobayashi et al. ............ 310/71 |
| 2001/0043018 A1 * | 11/2001 | Haydock et al. ............... 310/71 |
| 2003/0178896 A1 * | 9/2003 | Crane ...................... 310/68 R |
| 2004/0070293 A1 * | 4/2004 | Kabasawa et al. ............. 310/71 |
| 2004/0251752 A1 * | 12/2004 | Shinzaki et al. ............... 310/71 |
| 2004/0256941 A1 * | 12/2004 | Yoneda et al. ............... 310/179 |
| 2005/0189828 A1 * | 9/2005 | Nakayama et al. ............ 310/71 |
| 2006/0138883 A1 * | 6/2006 | Yagai et al. ................... 310/71 |

FOREIGN PATENT DOCUMENTS

| | | |
|---|---|---|
| JP | 2004-56873 A | 2/2004 |
| JP | 2004-096841 A | 3/2004 |

OTHER PUBLICATIONS

Japanese Office Action dated Jan. 7, 2009 (mailing date), issued in corresponding Japanese Patent Application No. 2005-254569.

* cited by examiner

*Primary Examiner*—Thanh Lam
(74) *Attorney, Agent, or Firm*—Westerman, Hattori, Daniels & Adrian, LLP.

(57) ABSTRACT

In a wire-connection structure of a motor, bus rings each formed by a bent wire material into a substantially annular shape and arranged along a stator includes: a plurality of large diameter portions and a plurality of small diameter portions extending alternately in a circumferential direction; and a plurality of link portions extending in a radial direction and connecting the adjacent large diameter portion and small diameter portion to each other. Windings of the coils are wire-connected to the link portions. Therefore, it is unnecessary to form the link portions of the bus rings into a U-shape or double-wire overlapping shape, thereby facilitating processing. Moreover, the width of the wire-connection portion in the circumferential direction does not exceed the thickness of a single wire material, thereby facilitating connection work by a crimping tool in a narrow space. Thus, the structure of a crimping portion for fixing by crimping the winding of the coil to the bus ring is simplified, and a space for inserting the crimping tool is secured to improve workability.

6 Claims, 11 Drawing Sheets

WIRE-CONNECTION STRUCTURE OF MOTOR

RELATED APPLICATION DATA

The Japanese priority application No. 2005-254569 upon which the present application is based is hereby incorporated in its entirety herein by reference.

BACKGROUND OF THE INVENTION

1. Field of the Invention

The present invention relates to a wire-connection structure of a motor, comprising: an annular stator including coils of a plurality of phases, the coils being arranged alternately in a circumferential direction; bus rings of a plurality of phases, each of the bus rings being formed by a bent wire material into a substantially annular shape and arranged along the stator; windings of the coils of the same phase being arranged at predetermined intervals and wire-connected to each other by the corresponding bus ring.

2. Description of the Related Art

Japanese Patent Application Laid-open No. 2004-96841 discloses a structure of a direct-current brushless motor in which, in order to wire-connect ends of windings of a plurality of coils of U-phase, V-phase and W-phase constituting a stator respectively to U-phase, V-phase and W-phase bus rings fixed along a side face of the stator, wire-connection portions are provided so as to protrude in radially inward directions from the U-phase, V-phase and W-phase bus rings into a U-shape or double-wire overlapping shape, and windings of the U-phase, V-phase and W-phase coils corresponding to connection terminals fixed to the wire-connection portions by crimping are fixed by crimping to the wire-connection portions.

However, in the conventional structure, the wire-connection portions are provided by forming the wire materials of the U-phase, V-phase and W-phase bus rings into a U-shape or double-wire overlapping shape, thereby increasing the number of steps for processing the wire-connection portions is increased to increase the cost; and moreover, the wire-connection portion has a width of more than twice that of the wire material, thereby making it difficult to secure a space to insert a tool for crimping and fixing the connection terminal to the wire-connection portion to deteriorate workability.

SUMMARY OF THE INVENTION

The present invention has been achieved in view of the above circumstances, and has an object to simplify the structure of a wire-connection portion where a winding of a coil is connected to a bus ring of a motor, and to improve workability by securing a space to insert a tool for connecting wires.

In order to achieve the above-mentioned object, according to a first feature of the invention, there is provided a wire-connection structure of a motor, comprising: an annular stator including coils of a plurality of phases, the coils being arranged alternately in a circumferential direction; bus rings of a plurality of phases, each of the bus rings being formed by a bent wire material into a substantially annular shape and arranged along the stator; windings of the coils of the same phase being arranged at predetermined intervals and wire-connected to each other by the corresponding bus ring, where in the bus rings comprises: a plurality of large diameter portions and a plurality of small diameter portions extending alternately in the circumferential direction; and a plurality of link portions extending in a radial direction and connecting the adjacent large diameter portion and small diameter portion to each other, and wherein the windings of the coils are wire-connected to the link portions.

With the first feature, since the bus ring substantially annularly formed by a bent wire material and arranged along the stator comprises a plurality of large diameter portions and a plurality of small diameter portions extending alternately in the circumferential direction, and a plurality of link portions extending in the radial direction and connecting the adjacent large diameter portion and small diameter portion to each other; and among windings of the coils of the plurality of phases constituting the stator and arranged at predetermined intervals, windings of the coils of the same phase are wire-connected to the link portions. Therefore, it is unnecessary to form the bus ring into a U-shape or double-wire overlapping shape, thereby facilitating processing. Moreover, the width of the wire-connection portion in the circumferential direction does not exceed the thickness of a single wire material, thereby easily securing a space for wire-connection work.

According to a second feature of the present invention, in addition to the first feature, the bus rings of the plurality of phases are arranged so as to be laminated with predetermined gaps in an axis direction of the stator.

With the second feature, since the bus rings of the plurality of phases are arranged while being laminated with predetermined gaps therebetween in the axial direction of the stator, short circuit due to contact between the bus rings of the different phases can be prevented.

According to a third feature of the present invention, in addition to the first feature, the bus rings of the plurality of phases have the same shape and are arranged with phases displaced in the circumferential direction.

With the third feature, since the bus rings of the plurality of phases having the same shape are arranged with phases displaced in the circumferential direction, the bus rings of the different phases obtain compatibility, thereby contributing to reduction of the number of part types and the cost.

According to a fourth feature of the present invention, in addition to any of the first to third features, the bus rings are supported on elastic support members fixed to insulators of the coils.

With the fourth feature, since the bus rings are supported on the elastic support members fixed to the insulators of the coils, vibration of the bus rings can be suppressed by the elastic support members.

A U-phase coil 21U, a V-phase coil 21V and a W-phase coil 21W of an embodiment correspond to the coils of the present invention. A U-phase bus ring 32U, a V-phase bus ring 32V and a W-phase bus ring 32W of the embodiment correspond to the bus rings of the present invention.

The above-mentioned object, other objects, characteristics, and advantages of the present invention will become apparent from a preferred embodiment, which will be described in detail below by reference to the attached drawings.

DESCRIPTION OF THE PREFERRED EMBODIMENT

Figure 1:
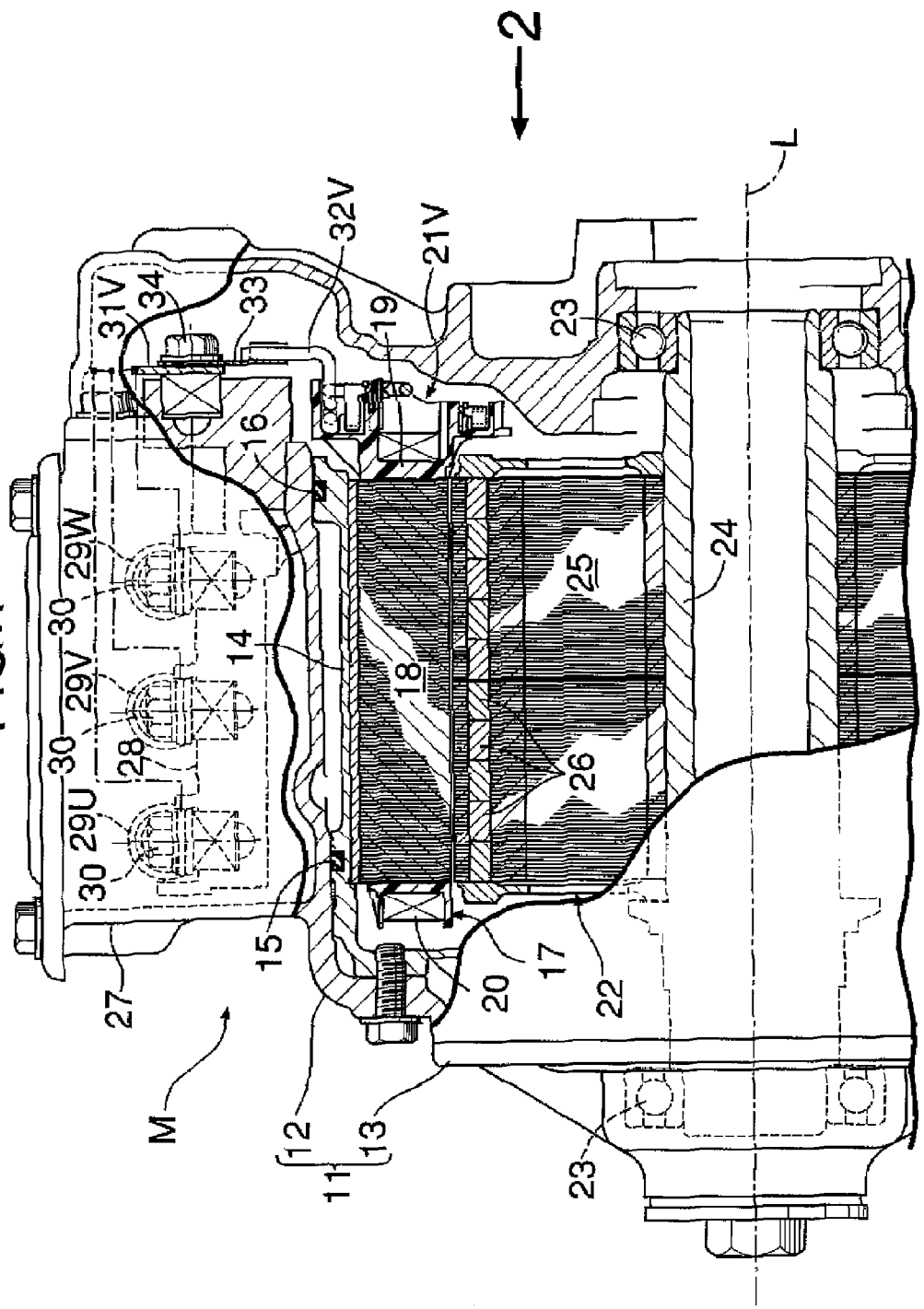
FIG. 1 is a longitudinal sectional view of a direct-current brushless motor.

As shown in FIG. 1, a motor case 11 of a direct-current brushless motor M comprises a case body 12 and a cover plate 13 which are fastened together. The outer circumferential surface of a stator holder 14 is fitted via a pair of O-rings 15, 16 on the inner circumferential surface of the case body 12. An annular stator 17 is fixed to the inner circumferential surface of the stator holder 14. The stator 17 comprises six U-phase coils 21U, six V-phase coils 21V and six W-phase coils 21W each of which has a winding 20 wound around a laminated steel plate 18 via an insulator 19 and which are alternately connected to each other in the circumferential direction. A rotor 22 is arranged inside the stator 17. The rotor 22 comprises: a shaft 24 rotatably supported on the case body 12 and the cover plate 13 by ball bearings 23, 23, respectively; a laminated steel plate 25 fixed to the outer circumference of the shaft 24; and a plurality of permanent magnets 26 fixed to an outer circumferential portion of the laminated steel plate 25.

Figure 2:
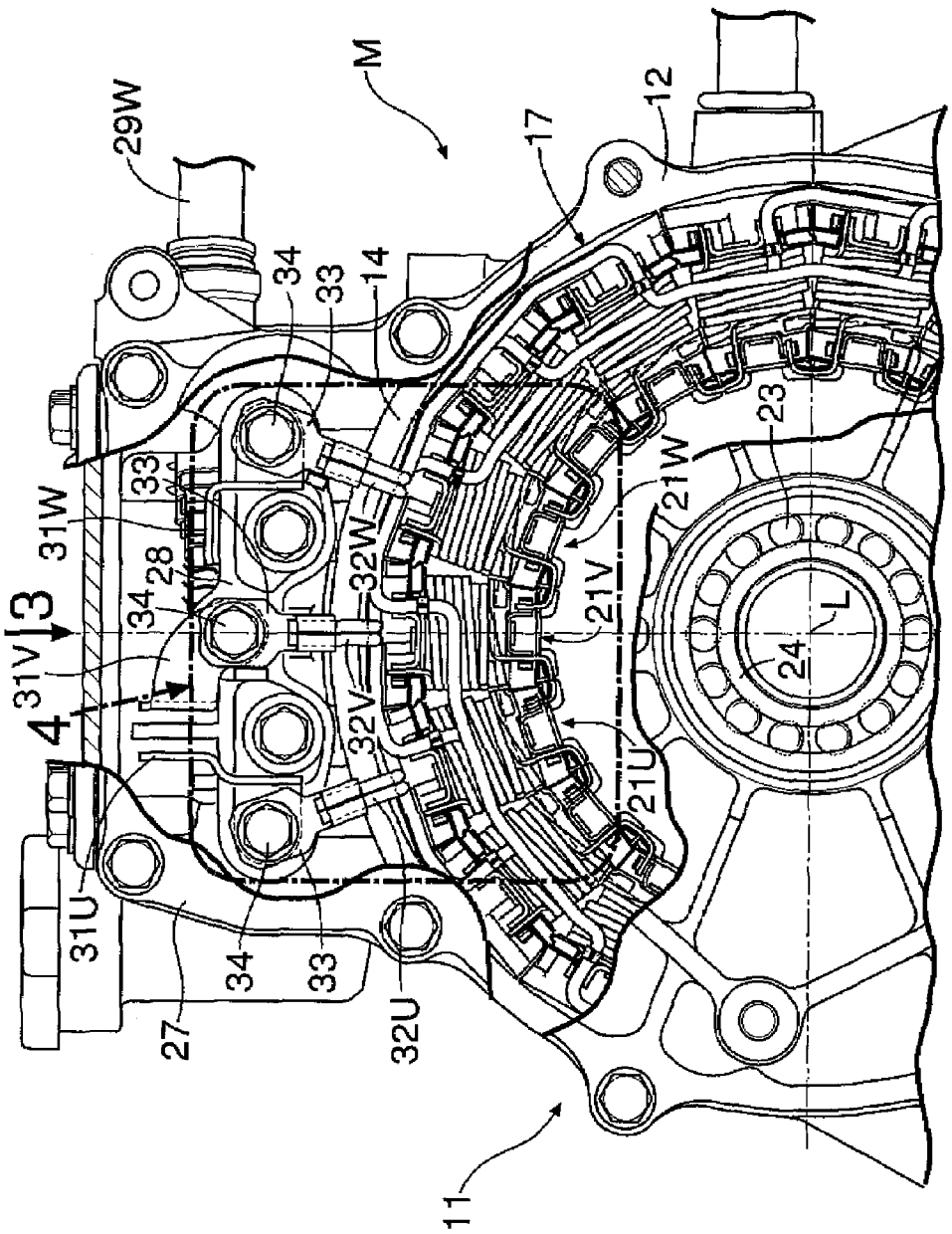
FIG. 2 is a view taken in the direction of arrow 2 in FIG. 1.
Figure 3:
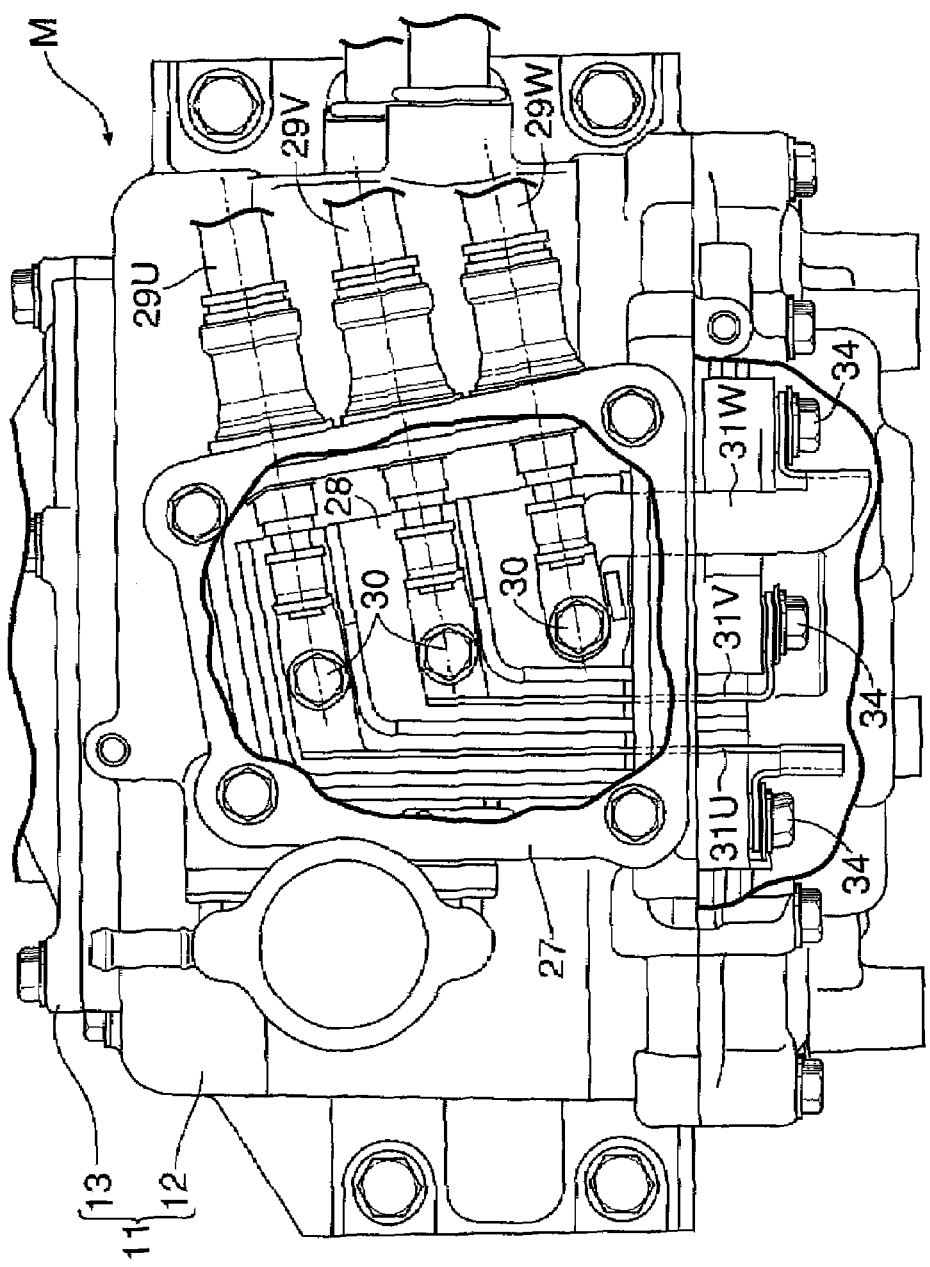
FIG. 3 is a view taken in the direction of arrow 3 in FIG. 2.

As is clear from FIGS. 1 to 3, a terminal base 28 is fixed to the interior of a terminal box 27 which is integrally formed at an upper part of the case body 12. A U-phase power line 29U, a V-phase power line 29V and a W-phase power line 29W which penetrate one side face of the terminal box 27 are connected respectively to one ends of a U-phase terminal 31U, a V-phase terminal 31V and a W-phase terminal 31W which are fixed to the upper face of the terminal base 28 by bolts 30. Lug plates 33 are provided at ends of the U-phase bus ring 32U, the V-phase bus ring 32V and the W-phase bus ring 32W, and connected by bolts 34 to the other ends of the U-phase terminal 31U, the V-phase terminal 31V and the W-phase terminal 31W, respectively.

Figure 7:
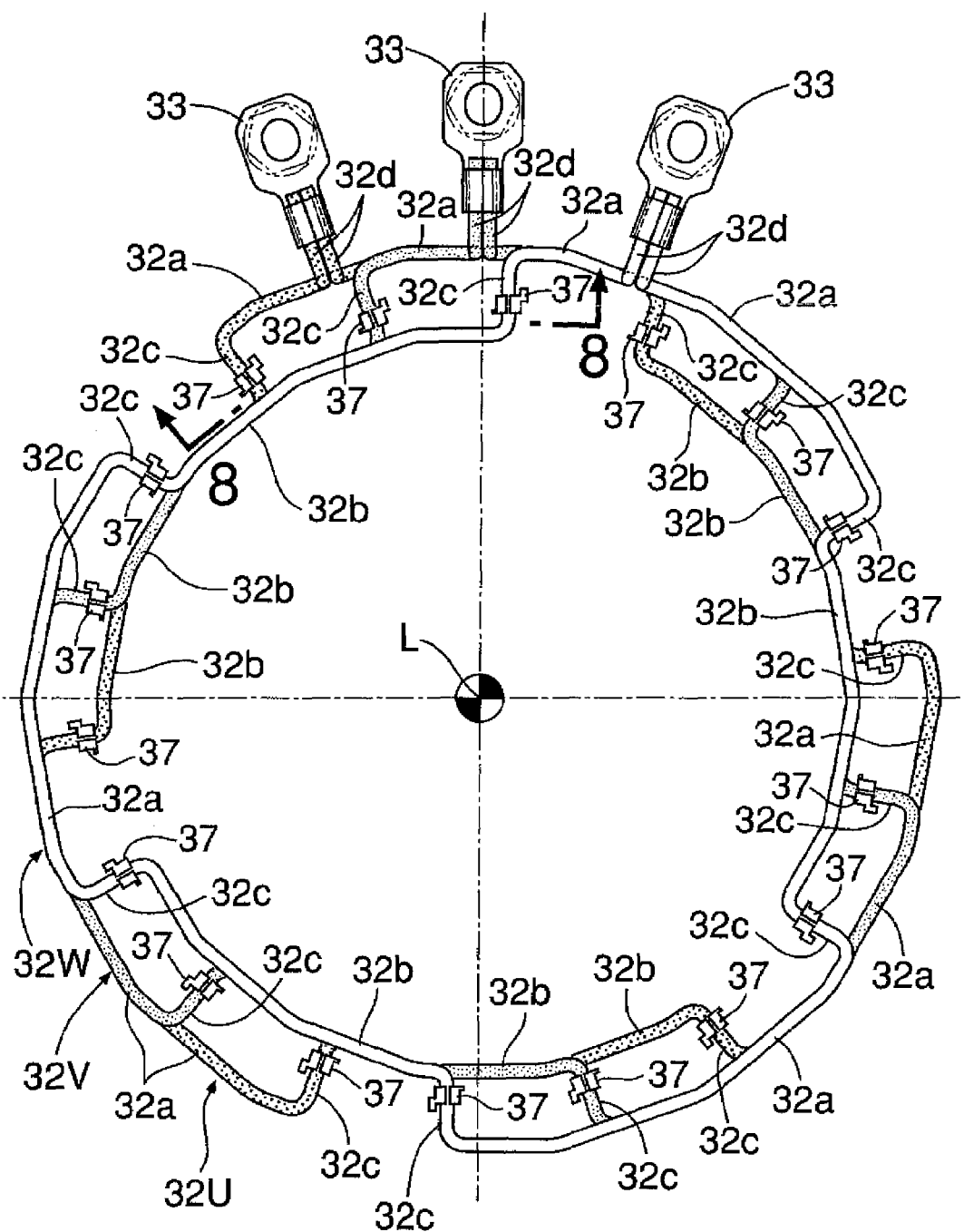
FIG. 7 is a front view of a bus ring.
Figure 8:
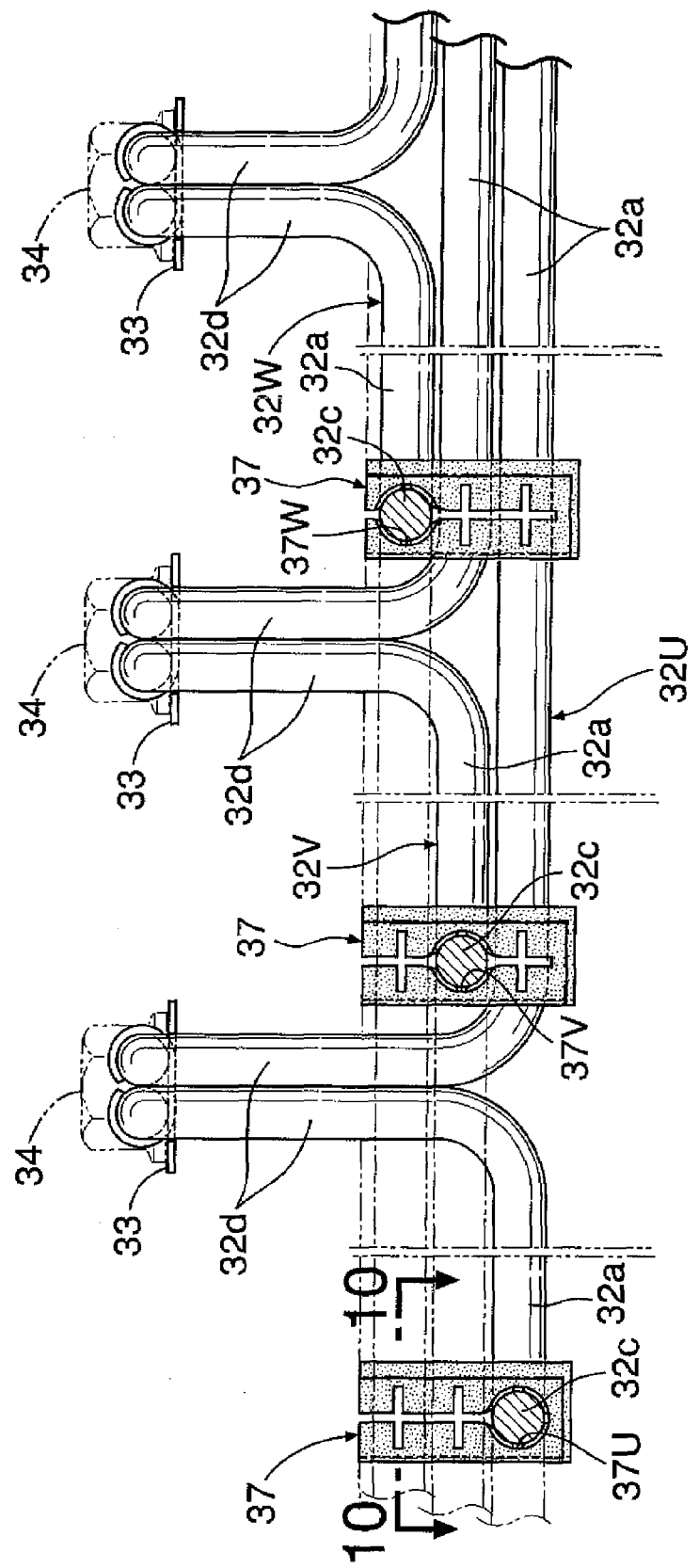
FIG. 8 is an enlarged sectional view taken along line 8-8 in FIG. 7.
Figure 9:
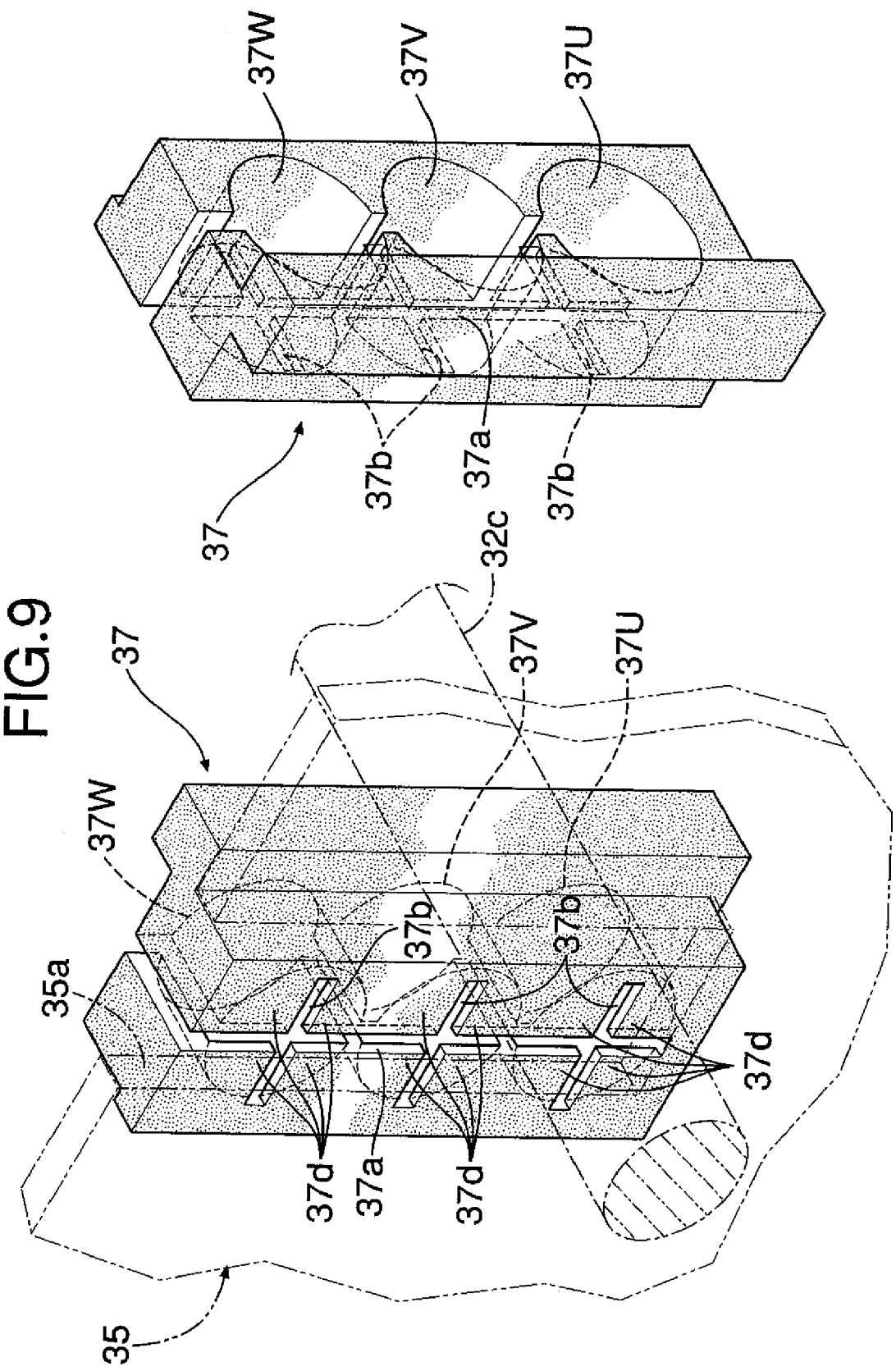
FIG. 9 is a single part view of an elastic support member.
Figure 10:
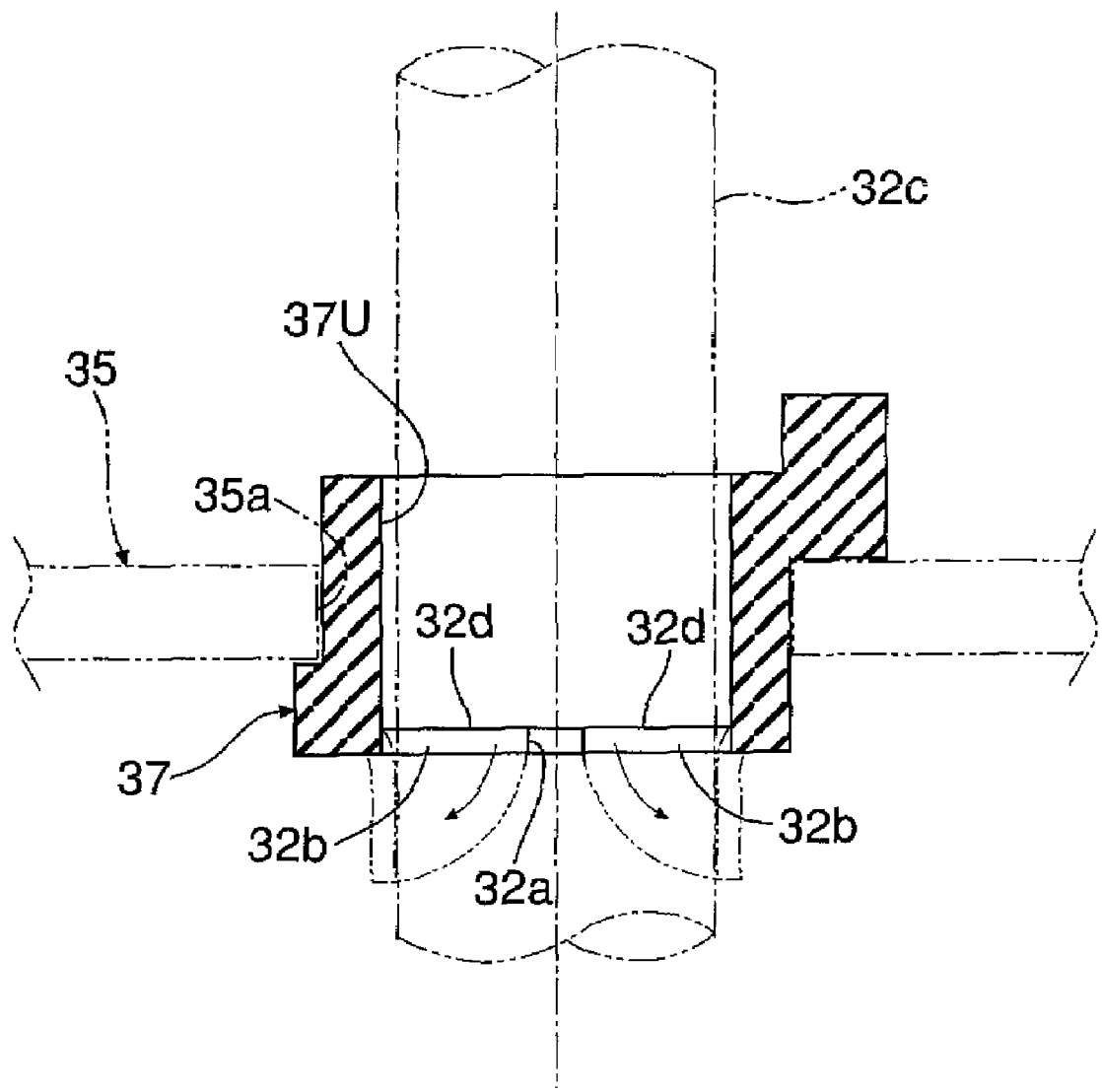
FIG. 10 is a sectional view taken along line 10-10 in FIG. 8.

As is clear from FIGS. 7 and 8, the U-phase bus ring 32U is formed by bending a single wire material into a substantially annular shape. The U-phase bus ring 32U comprises: three arc-shaped large diameter portions 32a positioned on an outer side in the radial direction; three arc-shaped small diameter portions 32b positioned on an inner side in the radial direction; and six straight link portions 32c connecting ends of the adjacent large diameter portions 32a and small diameter portions 32b to each other in the radial direction. In one of the three large diameter portions 32a, a pair of extension portions 32d, 32d extending in the axis L direction and then extending in the radially outward direction are provided at opposite ends of the wire material, and the pair of extension portions 32d, 32d are bundled by the lug plate 33. The U-phase bus ring 32U, the V-phase bus ring 32V and the W-phase bus ring 32W are the same parts having compatibility, and they are arranged with phase displacement of 20° from each other.

As is clear from FIGS. 5, 6, and 8 to 10, an outer flange 35 and an inner flange 36 are provided at one end of the axis L direction of the insulator 19 in ach of the U-phase coils 21U, the V-phase coils 21V and the W-phase coils 21W, wherein the outer flange 35 is positioned on an outer side in the radial direction, and an inner flange 36 is positioned on an inner side in the radial direction. An elastic support member 37 made of rubber is fitted and held by a rectangular support groove 35a formed in the outer flange 35. The elastic support member 37 includes: three support holes 37U, 37V, 37W whose one end sides are closed; a single vertical slit 37a formed in the closed-surfaces of the support holes 37U, 37V, 37W; and three horizontal slits 37b crossing the vertical slit 37a. Four flaps 37d are formed by the vertical slit 37a and the horizontal slits 37b on the closed surface of each of the support holes 37U, 37V, 37W.

Among the three support holes 37U, 37V, 37W of the elastic support member 37, the link portion 32c of the U-phase bus ring 32U is elastically fitted in the support hole 37U which is the farthest from the opening of the longitudinal slit 37a, the link portion 32c of the W-phase bus ring 32W is elastically fitted in the support hole 37W which is the closest to the opening of the longitudinal slit 37a, and the link portion 32c of the V-phase bus ring 32V is elastically fitted in the central support hole 37V. With this arrangement, the U-phase bus ring 3U, the V-phase bus ring 32V and the W-phase bus ring 32W are arranged in parallel with small gaps in the axis L direction so that they do not contact each other. Further, when the link portions 32c of the U-phase bus ring 32U, the V-phase bus ring 32V and the W-phase bus ring 32W are fitted in the support holes 37U, 37V, 37W, each of the tour flaps 37d is elastically deformed to reliably support the link portions 32c and suppress vibration of the U-phase bus ring 32U, the V-phase bus ring 32V and the W-phase bus ring 32W.

Figure 4:
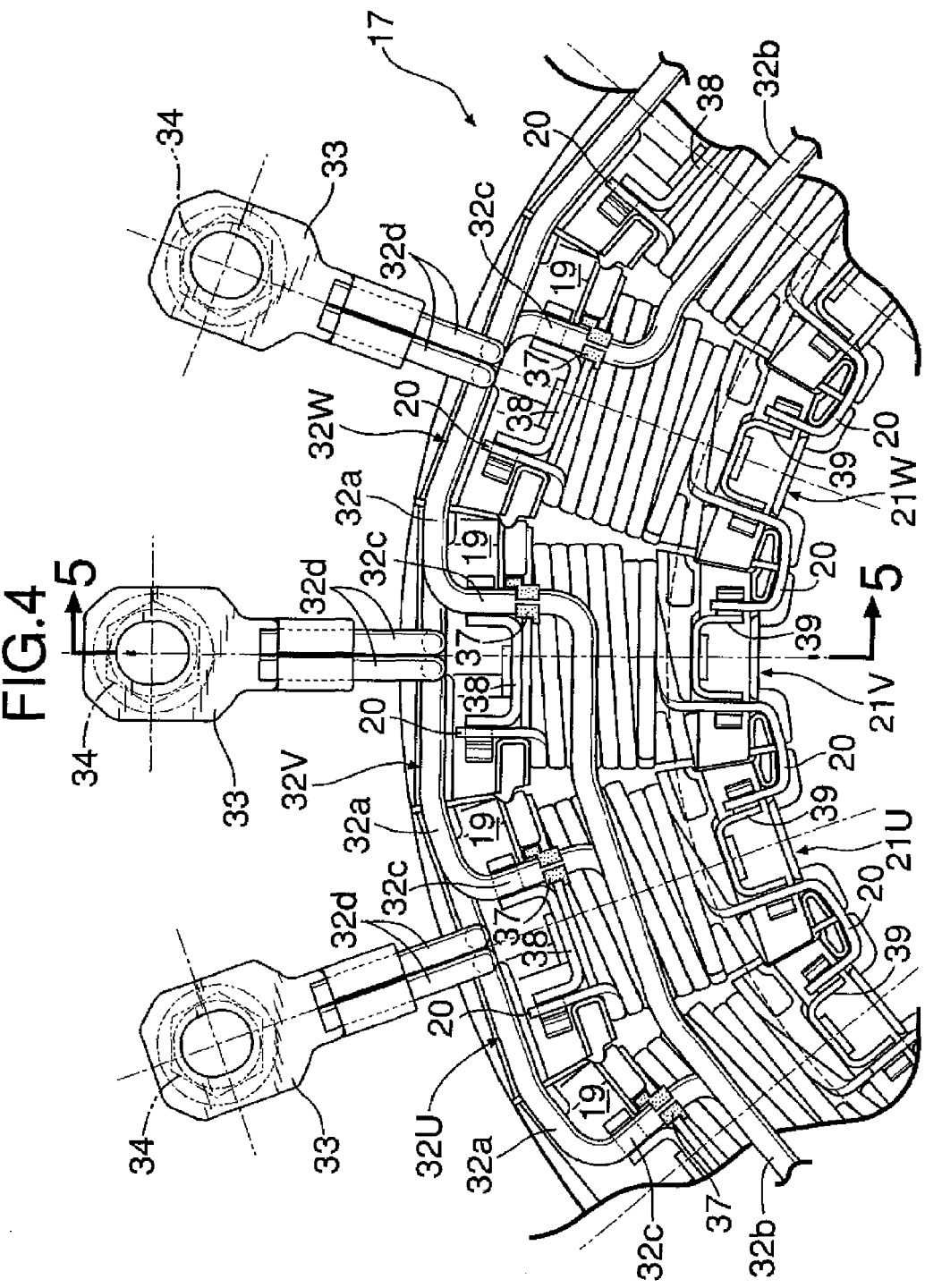
FIG. 4 is an enlarged view of portion 4 of FIG. 2.
Figure 5:
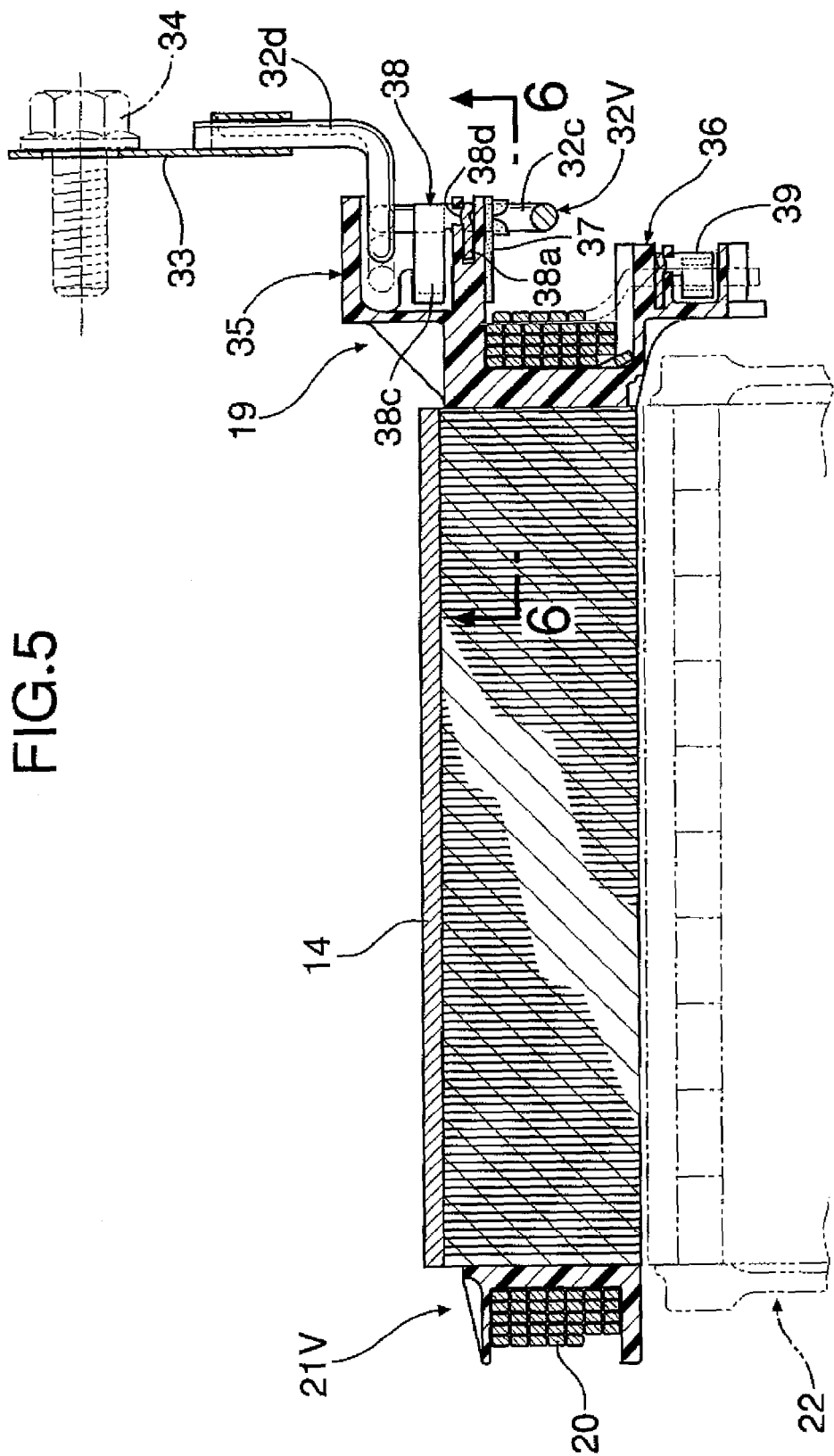
FIG. 5 is a sectional view taken along line 5-5 in FIG. 4.
Figure 6:
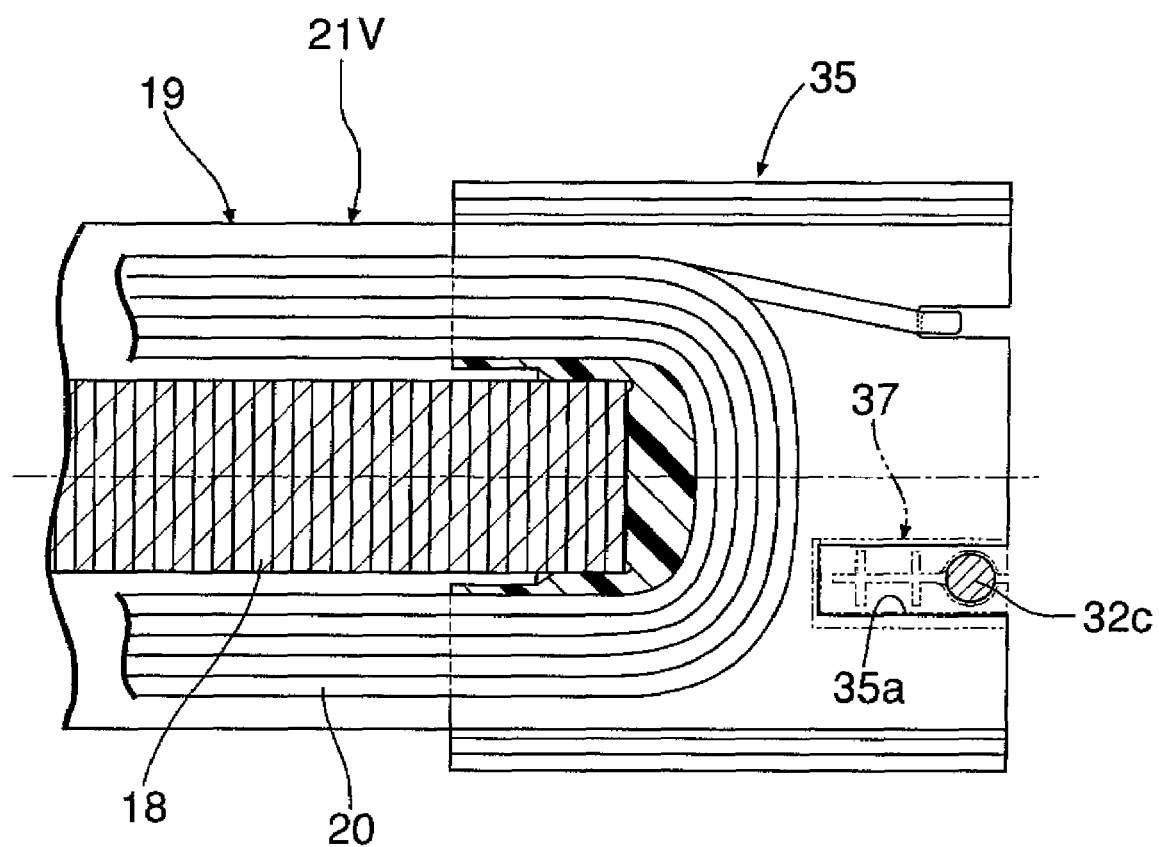
FIG. 6 is a sectional view taken along line 6-6 in FIG. 5.
Figure 11:
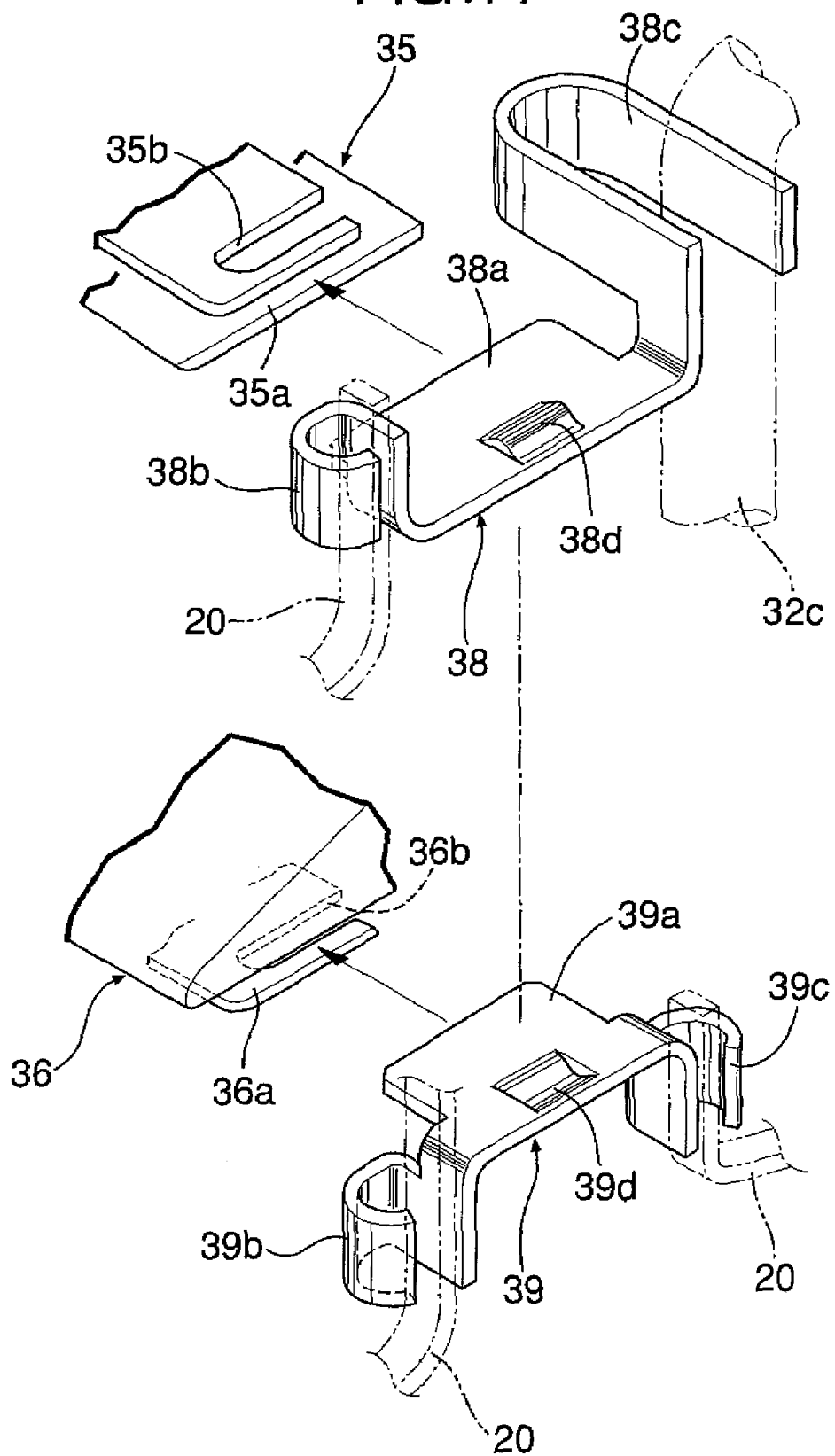
FIG. 11 is a perspective view of a connection terminal.

As shown in FIGS. 4, 5 and 11, a first connection terminal 38 comprises a flat support portion 38a, a first annular crimping portion 38b continuing to one end of the support portion 38a, and a second U-shaped crimping portion 38c continuing to the other end of the support portion 38a. In a state where the support portion 38a is fitted in a slit 35b formed in the outer flange 35 of the insulator 19, a lock claw 38d provided at the support portion 38a is engaged with a lock groove 35c of the outer flange 35 and held in place. One ends of the windings 20 of the U-phase coils 21U, the V-phase coils 21V and the W-phase coils 21W are wire-connected to the first crimping portions 38b by crimping. Moreover, the link portions 32c of the U-phase bus ring 32U, the V-phase bus ring 32V and the W-phase bus ring 32W are wire-connected to the second crimping portions 38c by crimping.

As a result, the windings 20 of the six U-phase coils 21U are connected to the U-phase bus ring 32U, the windings 20 of the six V-phase coils 21V are connected to the V-phase bus ring 32V, and the windings 20 of the 6 W-phase coils 21W are wire-connected to the W-phase bus ring 32W.

A second connection terminal 39 comprises a flat support portion 39a, a first annular crimping portion 39b continuing to one end of the support portion 39a, and a second annular crimping portion 39c continuing to the other end of the support portion 39a. In a state where the support portion 38a is fitted in a slit 36a formed in the inner flange 36 of the insulator 19, a lock claw 39d provided at the support portion 39a is engaged with a lock groove 36b of the inner flange 36 and held in place. The other ends of the windings 20 of the U-phase coils 21U, the V-phase coils 21V and the W-phase coils 21W are wire-connected to the first and second crimping portions 39b and 39c by crimping.

As a result, the other ends of the windings 20 of the U-phase coils 21U, the V-phase coils 21V and the W-phase coils 21W (total eighteen coils) are integrally wire-connected and grounded.

Therefore, when an electric current with phase displacement of 120° from the U-phase, V-phase and W-phase power lines 29U, 29V and 29W is supplied to the U-phase, V-phase and W-phase bus rings 32U, 32V and 32W, the U-phase, V-phase and W-phase coils 21U, 21V and 21W (total eighteen coils) excited in different phases, so that a rotational magnetic field is generated in the stator 17. Thus, an electromagnetic force acts between the stator 17 and the permanent magnets 26 thereby rotating the rotor 22.

As described above, since the link portions 32c where the U-phase, V-phase and w-phase bus rings 32U, 32V and 32W are connected to the U-phase, V-phase and W-phase coils 21U, 21V and 21W are formed by a single wire material extending in the radial direction, it is unnecessary to form the link portions 32c into a U-shape or double-wire overlapping shape, thereby facilitating processing. Moreover, when fixing the first connection terminals 38 to the link portions 32c using a crimping tool, work space can be secured as much as possible around the link portions 32c, thereby improving workability.

Further, since the U-phase, V-phase and W-phase bus rings 32U, 32V and 32W are formed to be compatible parts having the same shape and arranged with phase displacement in the circumferential direction, the number of part types can be reduced to contribute to reduction of the cost. Furthermore, since the U-phase, V-phase and W-phase bus rings 32U, 32V and 32W are arranged in a laminated manner with predetermined gaps provided therebetween in the axis L direction of the stator 17, short circuit due to contact therebetween can be prevented.

An embodiment of the invention has been described above, but various modifications in design may be made thereto without departing from the subject matter of the invention.

For example, the stator 17 in the embodiment comprises six each of the U-phase coils 21U, V-phase coils 21V and W-phase coils 21W, but the number is arbitrary.

What is claimed is:

1. A wire-connection structure of a motor, comprising:
   an annular stator including coils of a plurality of phases, the coils being arranged alternately in a circumferential direction;
   bus rings of a plurality of phases, each of the bus rings being formed by a bent wire material into a substantially annular shape and arranged along the stator;
   windings of the coils of the same phase being arranged at predetermined intervals and wire-connected to each other by the corresponding bus ring,
   wherein the bus rings comprises: a plurality of large diameter portions and a plurality of small diameter portions extending alternately in the circumferential direction; and a plurality of link portions extending in a radial direction and connecting the adjacent large diameter portion and small diameter portion to each other, and
   wherein the windings of the coils are wire-connected to the link portions.

2. The wire-connection structure of a motor according to claim 1, wherein the bus rings of the plurality of phases are arranged so as to be laminated with predetermined gaps in an axis direction of the stator.

3. The wire-connection structure of a motor according to claim 1, wherein the bus rings of the plurality of phases have the same shape and are arranged with phases displaced in the circumferential direction.

4. The wire-connection structure of a motor according to claim 1, wherein the bus rings are supported on elastic support members fixed to insulators of the coils.

5. The wire-connection structure of a motor according to claim 2, wherein the bus rings are supported on elastic support members fixed to insulators of the coils.

6. The wire-connection structure of a motor according to claim 3, wherein the bus rings are supported on elastic support members fixed to insulators of the coils.

* * * * *